United States Patent [19]
Wilson

[11] 3,874,639
[45] Apr. 1, 1975

[54] TRAILER MOVING DEVICE
[76] Inventor: Perry A. Wilson, 208 St. Clair, Fairview Heights, Ill. 62269
[22] Filed: July 16, 1973
[21] Appl. No.: 379,660

[52] U.S. Cl.................. 254/100, 214/1 H, 238/13, 254/85
[51] Int. Cl.............................................. B66f 11/00
[58] Field of Search ............ 254/84, 85, 100; 52/79, 52/127, DIG. 3; 104/262; 214/1 H; 238/13

[56] References Cited
UNITED STATES PATENTS

| | | | |
|---|---|---|---|
| 722,256 | 3/1903 | Sheeler | 238/13 |
| 1,635,617 | 7/1927 | Hall | 254/85 |
| 1,742,475 | 1/1930 | Kress | 238/13 |
| 3,107,898 | 10/1963 | Olson | 254/85 |
| 3,236,400 | 2/1966 | Turturro | 214/1 H |
| 3,512,315 | 5/1970 | Vitalini | 52/79 |
| 3,679,177 | 7/1972 | Scholz | 52/79 |

*Primary Examiner*—Al Lawrence Smith
*Assistant Examiner*—Robert C. Watson
*Attorney, Agent, or Firm*—Ralph W. Kalish

[57] ABSTRACT

A trailer moving device comprising a support beam for disposition transversely beneath the trailer to be moved, a pair of trucks provided on said beam for transverse lengthwise thereof and being adapted to accept portions of the trailer frame. A threaded drive member engaged to one of said trucks and being operated as by a hand tool for imparting movement to the engaged truck whereby the pair of trucks together with the supported trailer are caused to move unitarily with respect to the beam and in a direction normal to the longitudinal axis of the trailer.

8 Claims, 8 Drawing Figures

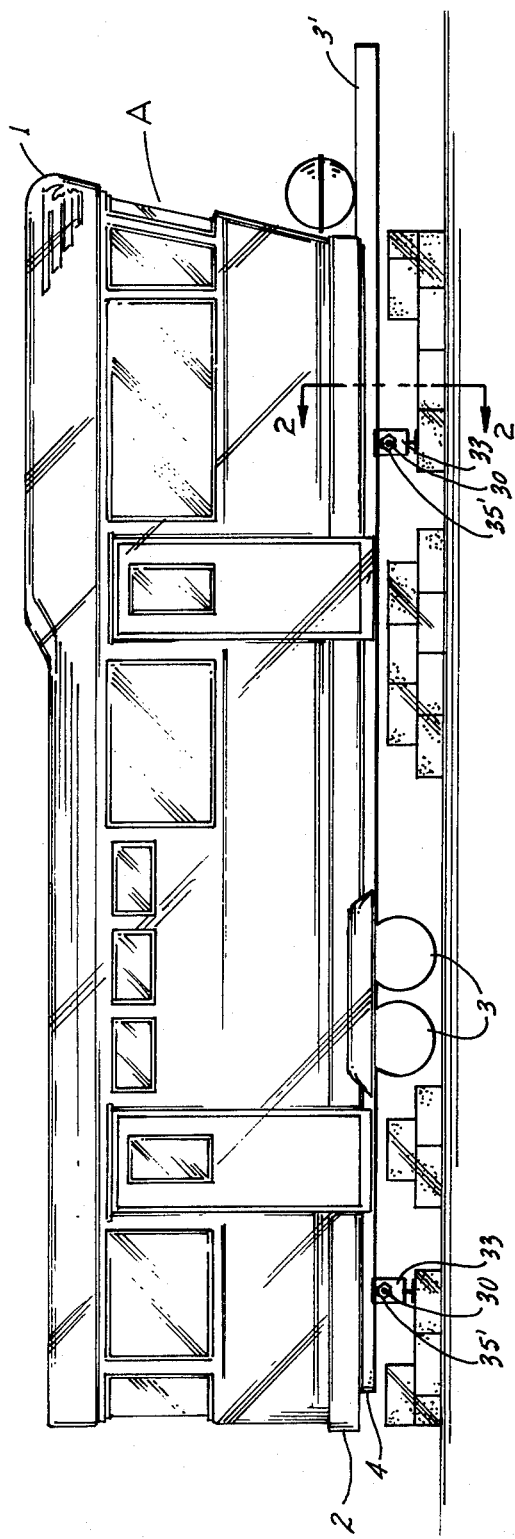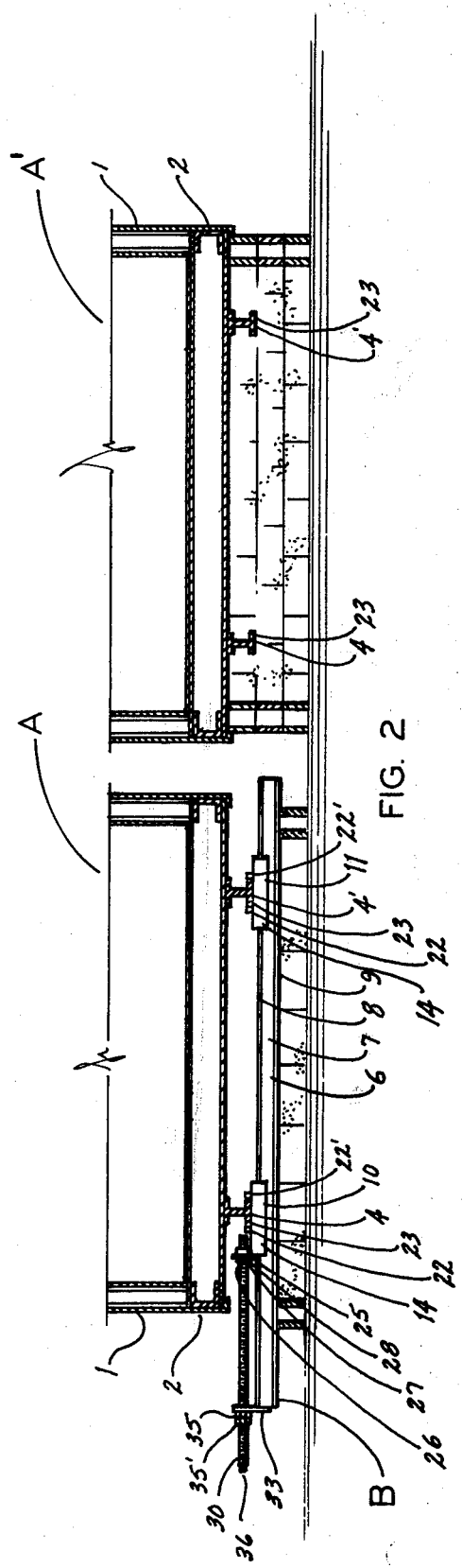

3,874,639

TRAILER MOVING DEVICE

BACKGROUND AND SUMMARY OF THE INVENTION

With the ever increasing use of house trailers as substantially permanent homes, there has arisen the understandable desire to continually increase the living area provided by such trailers but without violating the size limitations imposed by highway laws. There is currently developed the concept of providing a pair of co-ordinating trailers, each of which is of suitable size for road travel, but which are adapted to be placed in side by side, connecting relationship at a dwelling site whereby the space provided is effectively doubled.

However, heretofore considerable difficulty has been encountered in maneuvering the trailers into registering abutting relationship. For the most part, expedients adopted for such purposes have been of a most unsatisfactory nature, and have proven potentially hazardous to the individuals attempting such mating, as well as damaging to the trailers. These attempts have involved the use of greased skids, so-called come-along devices, manipulation of jacks, etc. At the present time, there has been no device or system for effecting the requisite union which may be used or practiced by the average trailer owner without peril.

Therefore, it is an object of the present invention to provide a trailer moving device which embodies mobile elements for detachable engagement with the frame of a trailer for effecting movement of the same in a direction lateral of the trailer.

It is another object of the present invention to provide a trailer moving device which can be easily utilized by the average individual trailer owner, without requiring the services of skilled personnel and without the necessity of complex tools and equipment.

It is another object of the present invention to provide a trailer moving device which can be used by a trailer owner without hazard either to person or to property, and which merely requires familiar hand tools for operation.

It is a further object of the present invention to provide a trailer moving device which is adapted to permit of relatively fine control so that the appropriate ultimate accurate positioning of the trailer to be moved is assured.

It is a still further object of the present invention to provide a trailer moving device which is comprised of but a few parts, all of which are of sturdy, simple construction; which device may be fabricated most economically and is durable in usage; and which device is easily operated in a safe and reliable manner.

BRIEF DESCRIPTION OF THE DRAWINGS

FIG. 1 is a side elevational view of a trailer of the mobile home type disposed upon a pair of trailer moving devices constructed in accordance with and embodying the present invention.

FIG. 2 is a vertical transverse sectional view taken on the line 2—2 of FIG. 1 showing the trailer of FIG. 1 with relation to a companion, previously positioned trailer to which it is to be mated.

DESCRIPTION OF THE PREFERRED EMBODIMENT

Figures 3, 4:
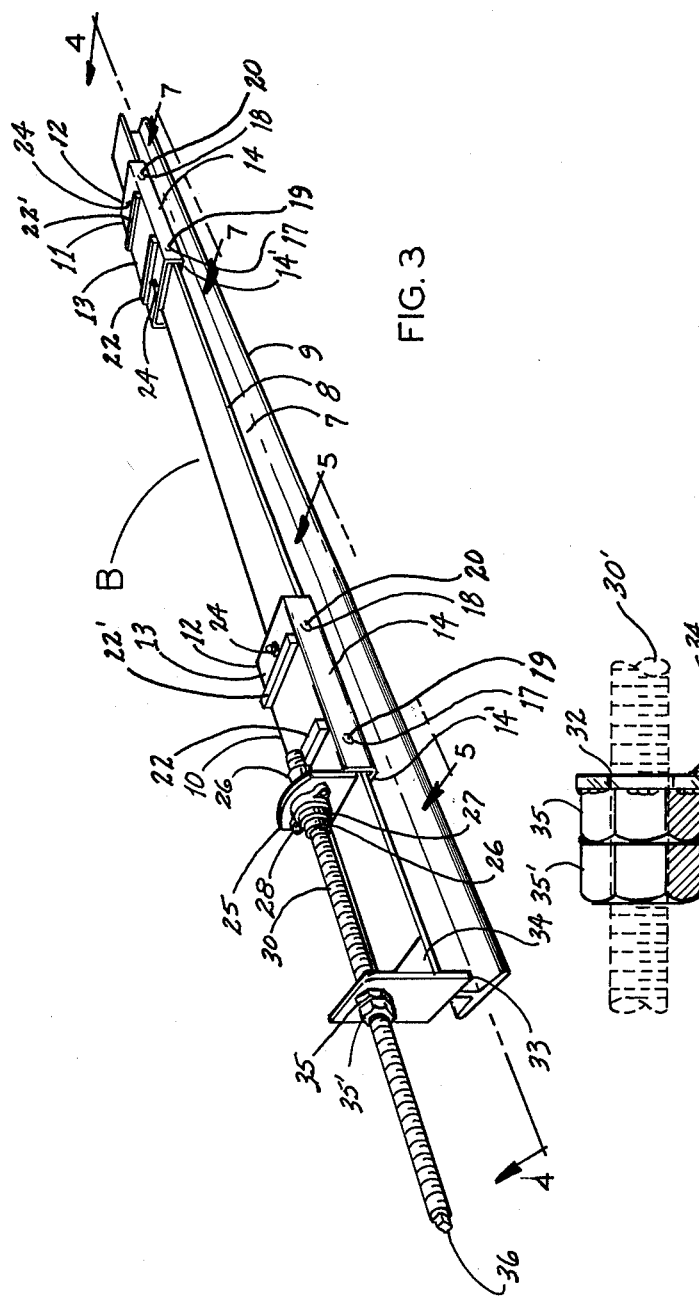
FIG. 3 is a perspective view of the device.
FIG. 4 is a fragmentary side elevational view of the device.
Figure 5:
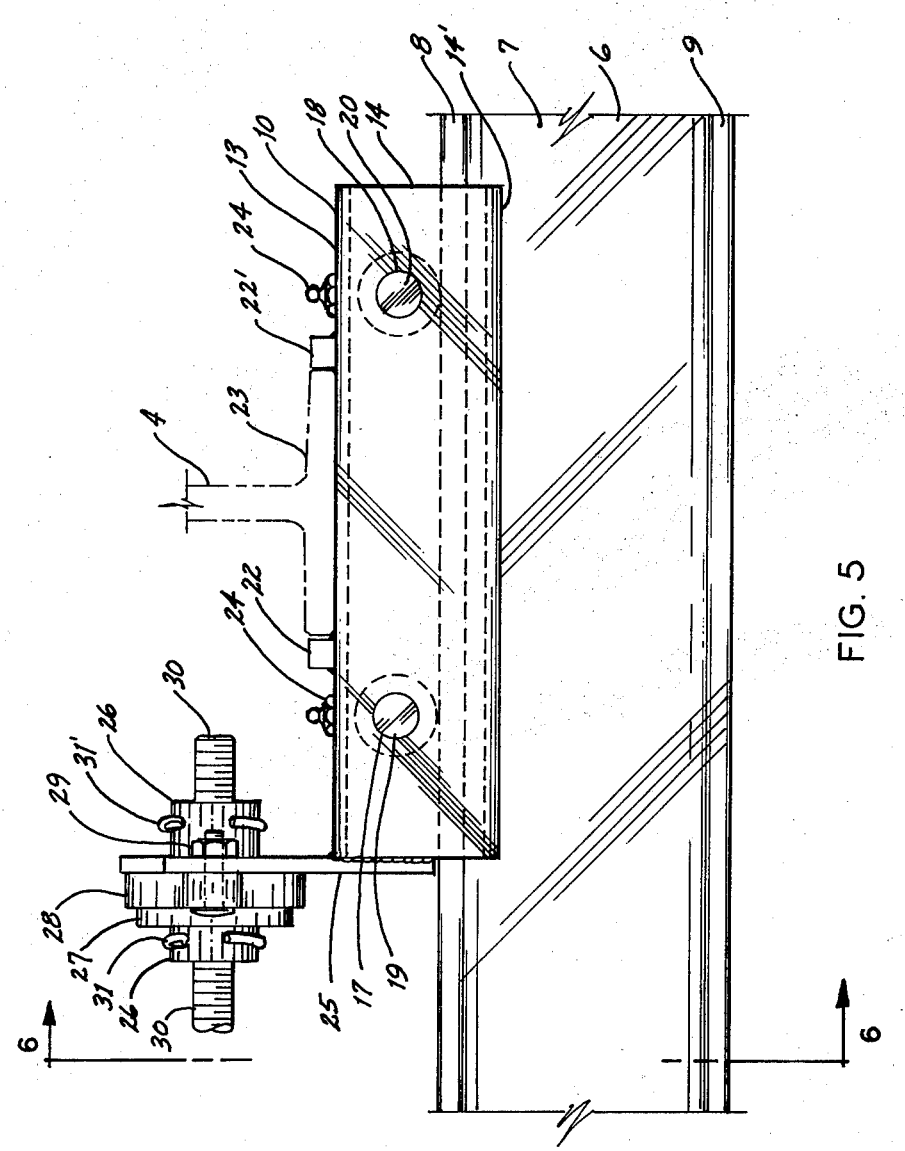
FIG. 5 is an enlarged side view taken on the line 5—5 of FIG. 3.
Figure 6:
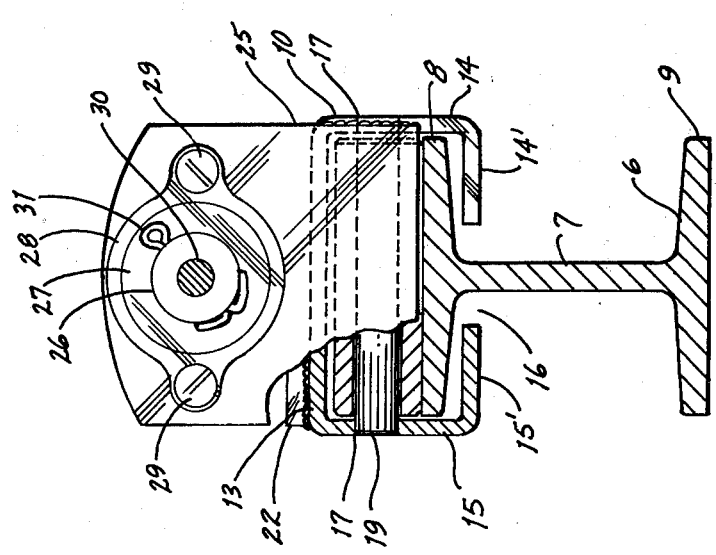
FIG. 6 is a vertical sectional view taken on the line 6—6 of FIG. 5, with the support plate being partially broken away.

Referring now by reference characters to the drawings which illustrate the preferred embodiment of the present invention, A designates a trailer which may be of any type, but for purposes of exposition herein, is shown as a house trailer, more popularly known as a mobile home, which comprises a body 1 mounted upon a chassis or frame 2 which is supported at its rearward end by a pair of wheels 3 and at its forward end includes a tongue 3' having the customary hitch for engaging a towing vehicle. As shown more fully in FIG. 2, chassis 2 incorporates a pair of depending, transversely spaced-apart beams 4,4' which are, preferably, of I configuration, and extend lengthwise of trailer A. As may best be seen in FIGS. 2 and 3, B designates a trailer moving device adapted for effecting lateral movement of trailer A; that is, in a directon normal to its longitudinal axis. Device B comprises a support beam 6 which is also of the I type, having a vertical web 7 and upper and lower flanges 8,9, respectively; the former constituting a rail or track for purposes presently appearing.

Disposed upon upper flange 8 for transverse along the track developed thereby is a pair of trucks or trolleys 10,11. Since trucks 10,11 are of like construction, the corresponding components of the same will bear like reference characters. Each truck 10,11 includes a split sleeve-like, unitary body 12 formed from plate or flat stock, as in the order of 3/16 inch thickness, having a top wall 13 slightly wider than upper flange 8 with side walls 14,15 depending from the opposite lateral portions of said top wall 13. At their lower ends, beneath upper flange 8, side walls 14,15 are continuous with inturned bottom wall sections 14',15', respectively, each of which terminates spacedly from web 7 for defining a longitudinal opening 16 between said sections 14',15', which is coextensive with body 12. Provided in side walls 14,15 proximate each end of body 12, is a pair of transversely aligned openings, as at 17,18 for accepting, as by a press fit, shafts 19,20, respectively, upon each of which is disposed, for free rotation thereabout, a roller 21; said latter peripherally engaging the track defined by upper flange 8 whereby said trucks are rendered mobile thereon. By reason of the inwardly turned character of bottom section 14',15', trucks 10,11 are prevented from unauthorized vertical displacement from beam 6.

Figure 7:
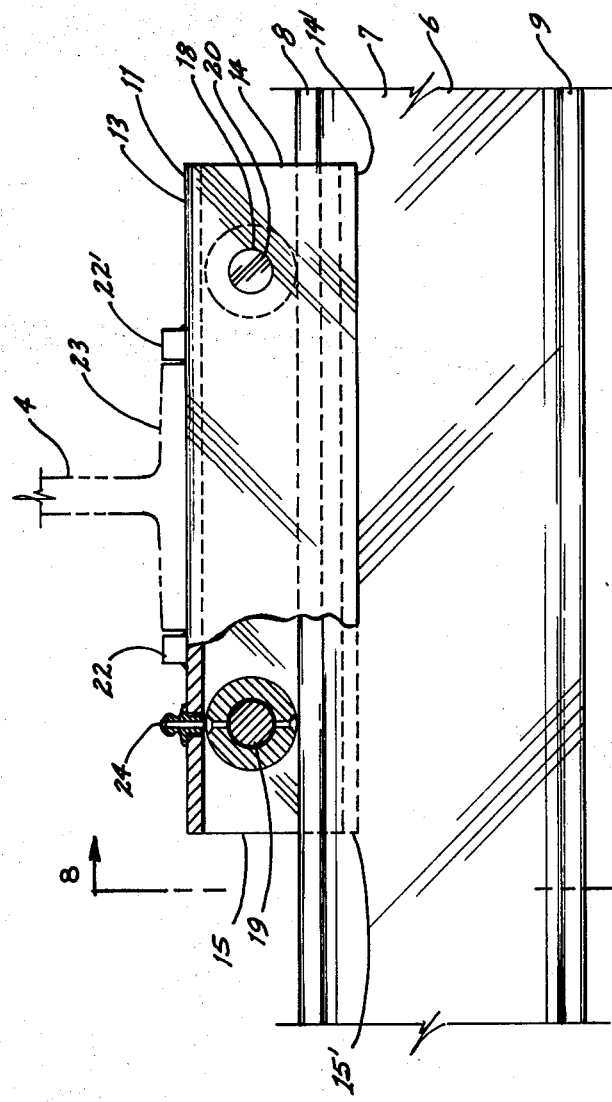
FIG. 7 is an enlarged side view taken on the line 7—7 of FIG. 3, with the side wall of the truck being partially broken away.
Figure 8:
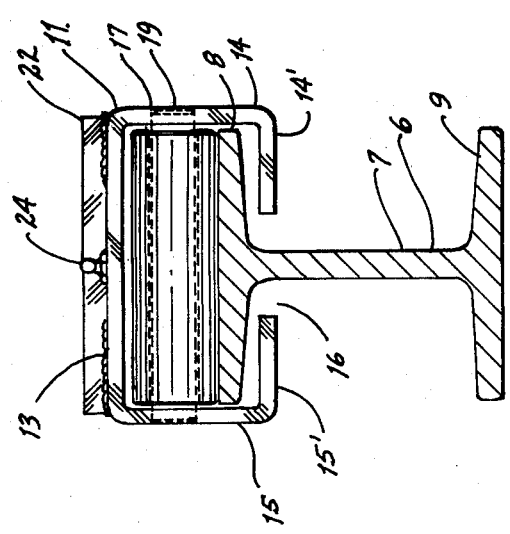
FIG. 8 is a vertical transverse sectional view taken on the line 8—8 of FIG. 7.

Mounted, as by welding, upon top wall 13 of each truck 10,11 is a pair of longitudinally spaced-apart transversely extending stops or abutments 22,22', being fabricated as of bar stock, and with the casing therebetween being adequate for snugly receiving the bottom flange 23 of beams 4,4' of trailer chassis 2; said stops 22,22' restraining said beams 4,4' against lateral displacement when so received within the intervening spacing (see FIG. 7). Each top plate 13 of trucks 10,11 is also suitably provided with a grease fitting 24 located immediately above each roller 21.

Fixed on truck 10, by welding, at its end remote from truck 11, is a support plate 2 having its bottom edge presented slightly upwardly of flange 8 and its upper edge located spacedly above top wall 13 of the related truck 10. Plate 25 above top wall 13 is apertured for receiving a smooth bored sleeve 26 centrally rigid within the inner race (not shown) of a ball bearing 27 which is carried within a mounting bracket 28 secured upon the outer face of plate 25 by bolts 29. Extending through sleeve 26 is an externally threaded push rod 30 which is secured within said sleeve 26 against axial displacement by cotter pins 31,31'. Thus, the inner end extremity of rod 30 is disposed immediately inwardly of plate 25. Rod 30 in its outer portion extends in a direction lengthwise of support beam 6 for projection through an opening 32 formed in a support plate 33 rigidly mounted on the end face of the proximate end of beam 6 for extension upwardly of upper flange 8 thereof; there being a pair of gussets 34 welded to said flange 8 and a truck confronting face of plate 33 for stabilizing same. Rigid on plate 33, on its face remote from truck 10, is a pair of axially aligned, welded together nuts 35,35' having the bore therethrough in registration with opening 32. Rod 30 is thoroughly engaged within said nuts 35,35' and projects laterally outwardly therebeyond; there being a square outer terminal, as at 36, on said rod 30 for suitable engagement with a crank or other tool, such as a ratchet wrench, for facilitating the imparting of rotative movement to rod 30.

It will thus be seen that truck 10 is a directly controlled unit by virtue of the engagement of the same to push rod 30, with the rotative movement, that is threading or unthreading turning, of which will cause translation of truck 10 longitudinally of support beam 6. Truck 11 is accordingly normally structurally independent that is, that said truck 11 would be normally freely movable along the track so that it could be rolled at will therealong, there being no inhibiting force such as the push rod 30 which acts upon truck 10; but is shown hereinbelow as caused to move conjointly with push rod 30 upon operation of device B; for purposes of exposition.

In actual usage with trailer A supported upon a pair of spaced apart devices B, with beams 4,4' received upon the top walls 13 of trucks 10,11, respectively, said trailer interconnects trucks 10,11 so as to effectively bring about an integrated unit for movement upon operation of push rods 30.

By turning of the associated push rods 30 counterclockwise as viewed from the operator, said trailer A will be moved along beams 6 by means of trucks 10,11 in a direction away from the operator and, hence, laterally of the longitudinal axis of trailer A. Conversely, by turning of push rods 30 in the opposite direction as counterclockwise viewed by the operator, trailer A may be thus moved toward its opposite side, that is, in the present instance toward the operator. It is obviously desirable that push rods 30 be operated substantially concurrently to prevent any twisting, as it were, of trailer A about its longitudinal axis.

Accordingly, devices B permit of facile handling of trailer A for effecting lateral travel thereof through the simple and easy manipulation of push rods 30 in the requisite direction. The operation of push rods 30 is achieved by engagement of a suitable hand tool upon terminal 36 such as particularly a ratchet wrench as above mentioned.

Referring now to FIGS. 1 and 2, the primary application of trailer moving devices B will become apparent. With one trailer, indicated A', in substantially permanent fixed position, as being supported upon blocks and the like, a second trailer, indicated A, is provided for abutting coordination with the fixed trailer A' in order to bring about a dwelling of increased size. Currently, cooperating trailers of this type are popularly referred to as "double wide." Said trailers A,A' are thus adapted to be in surface to surface abutting relationship along confronting matching side wall portions which have been previously prepared for such union as by removal of all weather proofing and the like therefrom. Trailer A is brought into immediate propinquity to fixed trailer A' and in substantially axially parallel relationship thereto. Said trailer A is then suitably elevated above ground level as by means of lifting devices or jacks to permit of disposition thereunder of a pair of devices B, one of which is placed behind the rear wheels 3 and the other of which is placed an equal distance from the front end of said trailer A. The devices B are suitably supported or "shimmed," as it were, as through blocks and the like, so that when the lifting devices have been removed trailer A will be supported upon devices B at the appropriate level for matching relationship with trailer A. Thus, lifting devices are lowered to bring the beams 4,4' onto trucks 10,11. Then the lifting devices are removed. With trailer A so supported, push rods 30 are then manipulated as above described to move trailer A into abutment against trailer A', at which juncture appropriate support elements such as blocks are placed beneath trailer A to maintain same in such selected position. Once trailer A is resting upon such support elements, the supports beneath trailer moving devices B are withdrawn to allow said devices B to be moved downwardly from engagement with trailer beams 4,4' and thereby permit of removal for storage purposes.

I claim

1. A load moving device comprising means defining, a track, a pair of first and second mobile load support members disposed on said track for movement therealong, each mobile load support member having a load-receiving surface for accepting a part of the same load whereby when said mobile support members are in load support condition said load serves to interconnect said load support members, rollers provided on each of said first and second mobile members for engaging said track and rendering said members mobile thereon, said first mobile load support member being normally freely rollable along said track, and means engaged to said mobile member operable for imparting motion thereto.

2. A load moving device as defined in claim 1 and further characterized by means interconnecting said motion imparting means to said track whereby said second mobile member is normally restricted to movement along said track responsive to operation of said motion imparting means.

3. A load moving device as defined in claim 2 and further characterized by said motion imparting means comprising an externally threaded rod, means engaging said rod to said second mobile member, and internally threaded means provided on said track for accepting and supporting said rod.

4. A load moving device as defined in claim 3 and further characterized by said second mobile load support member having a mounting plate projecting upwardly beyond its loadreceiving surface, said mounting plate being at the end of said second mobile load support member remote from said first mobile load support member, said rod engaging means being connected to said mounting plate, said rod extending in a direction substantially axially parallel with that of said track and in elevated relationship thereto.

5. A load moving device as defined in claim 4 and further characterized by said means defining a track being an elongated beam having an upper flat flange, said mobile load support member bodies each having a top wall in parallel spaced relationship to said flange, side walls located slightly outwardly of the adjacent edge of said flange, and bottom wall portions extending beneath said flange and spacedly therebelow, said rollers being located internally of said bodies for engaging said flange.

6. The combination with a vehicle body having a frame including a pair of elongated frame elements extending lengthwise of said vehicle body on the undersurface thereof, being directed downwardly, and in spaced apart relationship, of a vehicle body moving device comprising means defining a track disposed transversely of said vehicle body and beneath said elongated frame elements, a pair of mobile load support members disposed on said track for movement therealong and being presented beneath said frame elements whereby the latter overlie the former, each of said mobile members being aligned with the same frame element and having a surface-receiving a portion of the aligned load of the overlying frame element, one of said mobile load support members being freely movable along said track, and means engaged to the other of said mobile members operable to impart motion thereto whereby with said both mobile members in supporting relationship to the overlying frame element upon such operation motion will be transmitted through said vehicle body to the said one of said mobile load support members for effecting travel of said vehicle body along said track.

7. The combination as defined in claim 6 and further characterized by each of said mobile load support members having a main body portion, rollers mounted on said main body portion of each of said mobile load support members engaging said track, the frame element-receiving surface of said mobile load support members being provided in the upper portion of the said members, and means provided on said surface of each of said load support members for inhibiting displacement of the received portion of said frame element.

8. The combination as defined in claim 7 and further characterized by said motion imparting means comprising an externally threaded rod having opposite end portions, means engaging one end portion of said rod to the other of said mobile load support members in elevated relationship to said track, and internally threaded means provided on said track for accepting and supporting the other end portion of said rod.

* * * * *